US012610264B2

(12) United States Patent
Maganti et al.

(10) Patent No.: US 12,610,264 B2
(45) Date of Patent: Apr. 21, 2026

(54) USER EQUIPMENT WITH WIRELESS COVERAGE TRACKING CAPABILITIES

(71) Applicant: Apple Inc., Cupertino, CA (US)

(72) Inventors: Anjaneyulu Maganti, San Jose, CA (US); Ashley M. Williams, Mountain View, CA (US); Dhruv Khati, San Jose, CA (US); Jia Tang, San Jose, CA (US); John W. Fenwick, Woodside, CA (US); Sanjeevi Balasubramanian, San Jose, CA (US); Shiva Krishna Narra, San Jose, CA (US)

(73) Assignee: Apple Inc., Cupertino, CA (US)

( * ) Notice: Subject to any disclaimer, the term of this patent is extended or adjusted under 35 U.S.C. 154(b) by 486 days.

(21) Appl. No.: 16/945,133

(22) Filed: Jul. 31, 2020

(65) Prior Publication Data

US 2022/0022077 A1 Jan. 20, 2022

Related U.S. Application Data

(63) Continuation-in-part of application No. 16/930,988, filed on Jul. 16, 2020, now abandoned.

(51) Int. Cl.
*H04W 24/08* (2009.01)
*H04W 4/024* (2018.01)
(Continued)

(52) U.S. Cl.
CPC ........... *H04W 24/08* (2013.01); *H04W 4/024* (2018.02); *H04W 4/029* (2018.02); *H04W 24/10* (2013.01); *G06F 3/0488* (2013.01); *H04W 88/02* (2013.01)

(58) Field of Classification Search
CPC ..... H04W 24/10; H04W 4/024; H04W 4/029; H04W 88/02; H04B 17/318; G06F 3/0488
See application file for complete search history.

(56) References Cited

U.S. PATENT DOCUMENTS 7,149,533 B2 12/2006 Laird et al.
7,466,986 B2 12/2008 Halcrow et al.
(Continued)

FOREIGN PATENT DOCUMENTS

CN 1843051 A 10/2006
CN 102301778 A 12/2011
(Continued)

*Primary Examiner* — Steven Hieu D Nguyen
(74) *Attorney, Agent, or Firm* — Treyz Law Group, P.C.; Michael H. Lyons

(57) ABSTRACT

A communications network may include user equipment that communicates with external equipment. The user equipment may include an antenna, measurement circuitry, control circuitry, and a display. The antenna may receive downlink signals while the user equipment moves through a geographic area. The measurement circuitry may gather wireless performance metric data from the received signals. The control circuitry may determine whether the gathered wireless performance metric data exceeds, for a predetermined time period, a threshold value. The control circuitry may store respective geographic locations of the user equipment at each location in the geographic area where the gathered wireless performance metric data exceeds, for the predetermined time period, the threshold value. The control circuitry may, in response to a trigger condition, control the output device to produce an output that identifies at least one of the stored geographic locations to a user of the user equipment.

14 Claims, 7 Drawing Sheets

(51) Int. Cl.

| | | |
|---|---|---|
| *H04W 4/029* | (2018.01) | |
| *H04W 24/10* | (2009.01) | |
| G06F 3/0488 | (2022.01) | |
| H04W 88/02 | (2009.01) | |

(56) References Cited

U.S. PATENT DOCUMENTS

| | | | | |
|---|---|---|---|---|
| 7,532,898 | B2 | 5/2009 | Halcrow et al. | |
| 8,103,445 | B2 | 1/2012 | Smith et al. | |
| 8,665,847 | B2 | 3/2014 | Holostov et al. | |
| 8,930,458 | B2 | 1/2015 | Lewis | |
| 2008/0167806 | A1* | 7/2008 | Wheeler | G01C 21/26 |
| | | | | 340/932.2 |
| 2009/0005061 | A1 | 1/2009 | Ward et al. | |
| 2009/0054078 | A1* | 2/2009 | Golds | G01S 19/24 |
| | | | | 455/456.1 |
| 2010/0054087 | A1* | 3/2010 | Matsuzaki | G04R 20/04 |
| | | | | 368/14 |
| 2010/0091614 | A1* | 4/2010 | Fujisawa | G01S 19/35 |
| | | | | 368/14 |
| 2010/0195507 | A1* | 8/2010 | Marinier | H04L 1/20 |
| | | | | 370/242 |
| 2010/0214165 | A1* | 8/2010 | Baba | G04R 20/06 |
| | | | | 342/357.25 |
| 2012/0122472 | A1* | 5/2012 | Krishnamurthy | H04L 27/0012 |
| | | | | 455/456.1 |
| 2012/0209516 | A1* | 8/2012 | Lee | G01C 21/165 |
| | | | | 701/445 |
| 2014/0019550 | A1* | 1/2014 | Whitney | G06Q 30/0201 |
| | | | | 709/204 |
| 2014/0078892 | A1* | 3/2014 | Cave | H04W 24/00 |
| | | | | 370/242 |
| 2014/0106777 | A1* | 4/2014 | Fukuda | G01S 5/0027 |
| | | | | 455/456.1 |
| 2014/0106778 | A1* | 4/2014 | Fukuda | H04W 4/023 |
| | | | | 455/456.1 |
| 2014/0335795 | A1* | 11/2014 | Wilbur | H04W 4/024 |
| | | | | 455/67.11 |
| 2015/0079932 | A1* | 3/2015 | Zelinka | H04W 4/02 |
| | | | | 455/411 |
| 2015/0355308 | A1* | 12/2015 | Ishida | G01S 1/04 |
| | | | | 455/456.1 |
| 2016/0025861 | A1* | 1/2016 | Leclercq | G01S 19/34 |
| | | | | 342/357.65 |
| 2017/0318014 | A1* | 11/2017 | Korus | G06F 21/32 |
| 2018/0151010 | A1* | 5/2018 | Kusens | H04W 4/029 |
| 2019/0297506 | A1 | 9/2019 | Shoshan et al. | |
| 2019/0342147 | A1 | 11/2019 | O'Reirdan et al. | |
| 2020/0165099 | A1* | 5/2020 | Kuenzi | B66B 1/3461 |
| 2020/0247513 | A1* | 8/2020 | Garner | B63C 9/20 |
| 2022/0343820 | A1* | 10/2022 | Wen | G09G 3/20 |

FOREIGN PATENT DOCUMENTS

| | | |
|---|---|---|
| CN | 103024672 A | 4/2013 |
| CN | 103620441 A | 3/2014 |
| CN | 103797726 A | 5/2014 |
| CN | 104813717 A | 7/2015 |
| CN | 106231628 A | 12/2016 |
| CN | 107409287 A | 11/2017 |
| CN | 109073731 A | 12/2018 |

* cited by examiner

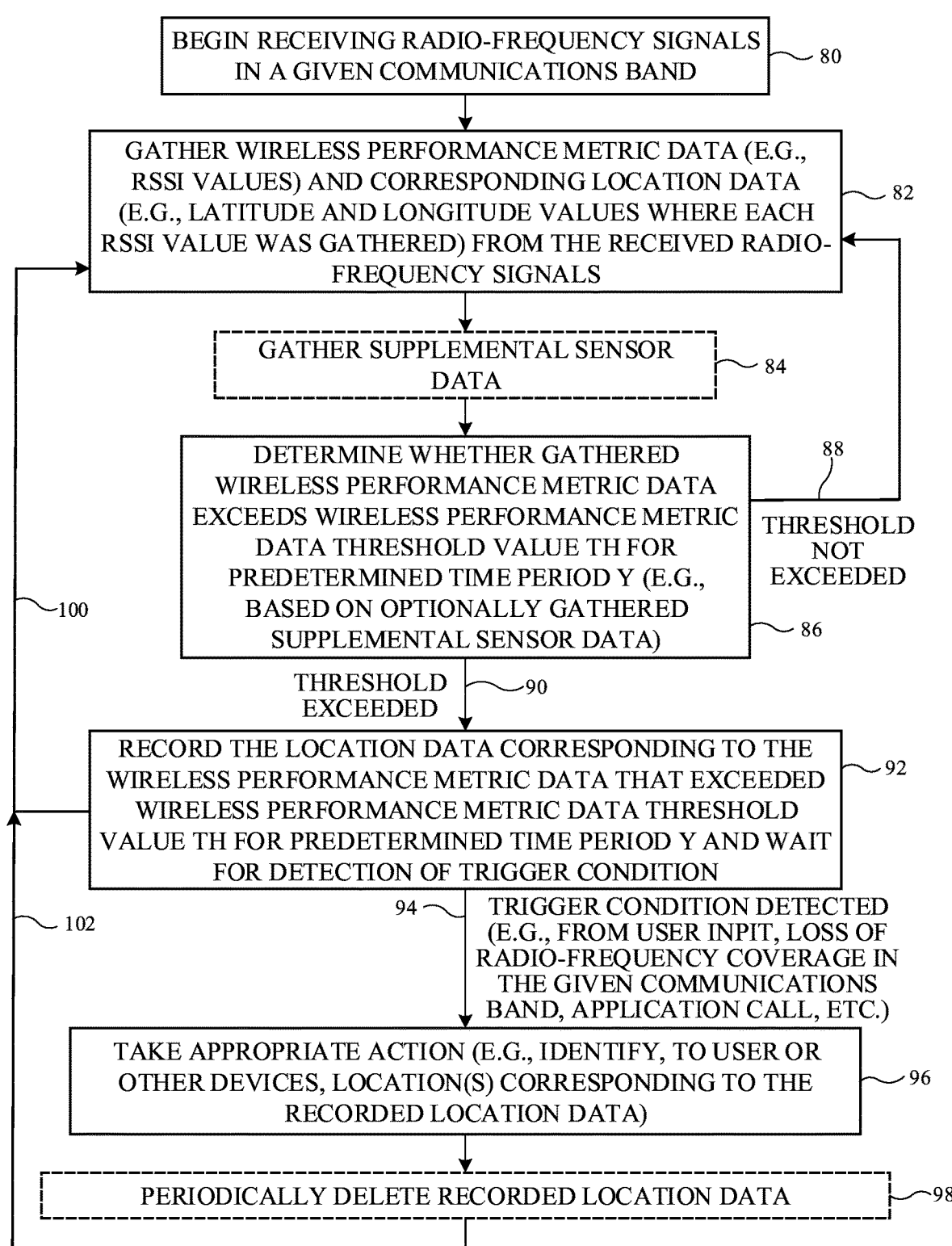

BEGIN RECEIVING RADIO-FREQUENCY SIGNALS IN A GIVEN COMMUNICATIONS BAND — 80

GATHER WIRELESS PERFORMANCE METRIC DATA (E.G., RSSI VALUES) AND CORRESPONDING LOCATION DATA (E.G., LATITUDE AND LONGITUDE VALUES WHERE EACH RSSI VALUE WAS GATHERED) FROM THE RECEIVED RADIO-FREQUENCY SIGNALS — 82

GATHER SUPPLEMENTAL SENSOR DATA — 84

DETERMINE WHETHER GATHERED WIRELESS PERFORMANCE METRIC DATA EXCEEDS WIRELESS PERFORMANCE METRIC DATA THRESHOLD VALUE TH FOR PREDETERMINED TIME PERIOD Y (E.G., BASED ON OPTIONALLY GATHERED SUPPLEMENTAL SENSOR DATA) — 86

88

THRESHOLD NOT EXCEEDED

100

THRESHOLD EXCEEDED — 90

RECORD THE LOCATION DATA CORRESPONDING TO THE WIRELESS PERFORMANCE METRIC DATA THAT EXCEEDED WIRELESS PERFORMANCE METRIC DATA THRESHOLD VALUE TH FOR PREDETERMINED TIME PERIOD Y AND WAIT FOR DETECTION OF TRIGGER CONDITION — 92

102

94 — TRIGGER CONDITION DETECTED (E.G., FROM USER INPIT, LOSS OF RADIO-FREQUENCY COVERAGE IN THE GIVEN COMMUNICATIONS BAND, APPLICATION CALL, ETC.)

TAKE APPROPRIATE ACTION (E.G., IDENTIFY, TO USER OR OTHER DEVICES, LOCATION(S) CORRESPONDING TO THE RECORDED LOCATION DATA) — 96

PERIODICALLY DELETE RECORDED LOCATION DATA — 98

*FIG. 4*

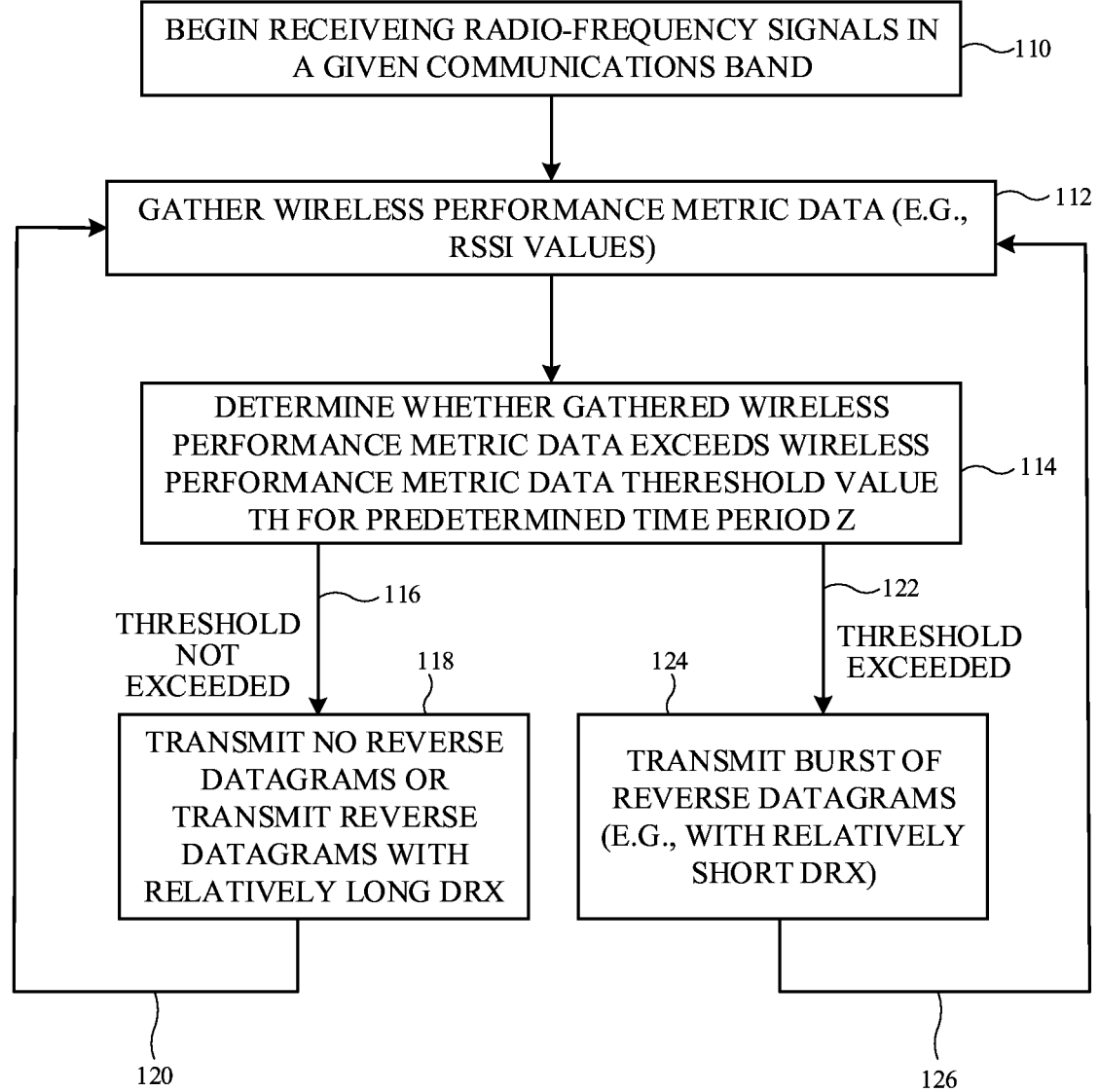

BEGIN RECEIVEING RADIO-FREQUENCY SIGNALS IN A GIVEN COMMUNICATIONS BAND —110

GATHER WIRELESS PERFORMANCE METRIC DATA (E.G., RSSI VALUES) —112

DETERMINE WHETHER GATHERED WIRELESS PERFORMANCE METRIC DATA EXCEEDS WIRELESS PERFORMANCE METRIC DATA THERESHOLD VALUE TH FOR PREDETERMINED TIME PERIOD Z —114

—116

THRESHOLD NOT EXCEEDED          118

—122

124          THRESHOLD EXCEEDED

TRANSMIT NO REVERSE DATAGRAMS OR TRANSMIT REVERSE DATAGRAMS WITH RELATIVELY LONG DRX

TRANSMIT BURST OF REVERSE DATAGRAMS (E.G., WITH RELATIVELY SHORT DRX)

USER EQUIPMENT WITH WIRELESS COVERAGE TRACKING CAPABILITIES

This application is a continuation-in-part of U.S. patent application Ser. No. 16/930,988, filed Jul. 16, 2020, which is hereby incorporated by reference herein in its entirety.

FIELD

This relates generally to wireless communications, including wireless communications between user equipment and external communications equipment.

BACKGROUND

Communications systems are used to convey wireless data using radio-frequency signals transmitted between user equipment and external communications equipment. The user equipment is operated by a user. Users often move through a given geographic area while carrying the user equipment and while the user equipment wirelessly communicates with the external communications equipment.

However, external communications equipment typically provides better wireless coverage for some locations within the geographic area than others. Indeed, the external communications equipment is often unable to provide any wireless coverage to certain locations within the geographic area. When the user moves to a location in the geographic area that has insufficient wireless coverage, the user will be unable to communicate with the external communications equipment. If the user urgently needs to communicate with the external communications equipment, such as during an emergency, the user will need to move to a location within the geographic area where there is satisfactory wireless coverage. This can be difficult to accomplish within a reasonable amount of time, especially in rural geographic areas.

It would therefore be desirable to be able to provide user equipment with improved wireless communications capabilities.

SUMMARY

A communications network may include user equipment that wirelessly communicates with external communications equipment. The user equipment may include a wireless transmitter, a wireless receiver, an antenna, measurement circuitry, control circuitry, and an output device. The antenna may receive radio-frequency downlink signals transmitted by the external communications equipment while the user equipment moves through a geographic area. The measurement circuitry may gather wireless performance metric data from the radio-frequency signals received by the antenna as the user equipment moves through the geographic area. The control circuitry may determine whether the gathered wireless performance metric data exceeds, for a predetermined time period, a threshold value. The control circuitry may store respective geographic locations of the user equipment at each location in the geographic area where the gathered wireless performance metric data exceeds, for the predetermined time period, the threshold value. The control circuitry may, in response to a trigger condition, control the output device to produce an output that identifies at least one of the stored geographic locations to a user of the user equipment.

The trigger condition may be a user input and/or an application call by an application running on the control circuitry. The output device may be a display. The control circuitry may control the display to produce a visual indicator associated with the stored geographic locations. For example, the display may display a map that identifies the stored geographic location, may display directions from the current location of the user equipment to the stored geographic locations, etc. In this way, the user equipment may inform the user of previous locations where the user equipment was within the coverage area of the external communications equipment. The user may then proceed to those locations without needing to blindly search for the coverage area after the user equipment has left the coverage area.

If desired, the transmitter may transmit reverse datagrams with a relatively low duty cycle or may forego transmission of reverse datagrams until the gathered wireless performance metric data exceeds, for the predetermined time period, the threshold value. Once the gathered wireless performance metric data exceeds, for the predetermined time period, the threshold value, the transmitter may transmit a burst of reverse datagrams with a relatively high duty cycle. This may serve to conserve power in the user equipment while there is a relatively low probability of performing satisfactory communications with the external communications equipment.

BRIEF DESCRIPTION OF THE DRAWINGS

FIG. 4 is a flow chart of illustrative steps that may be performed by user equipment to continue to perform wireless communications despite the user equipment moving outside of a coverage area of external wireless communications equipment in accordance with some embodiments.

FIG. 5 is a flow chart of illustrative steps that may be performed by user equipment to transmit bursts of reverse datagrams as the user equipment moves through a geographic area in accordance with some embodiments.

DETAILED DESCRIPTION

Figure 1:
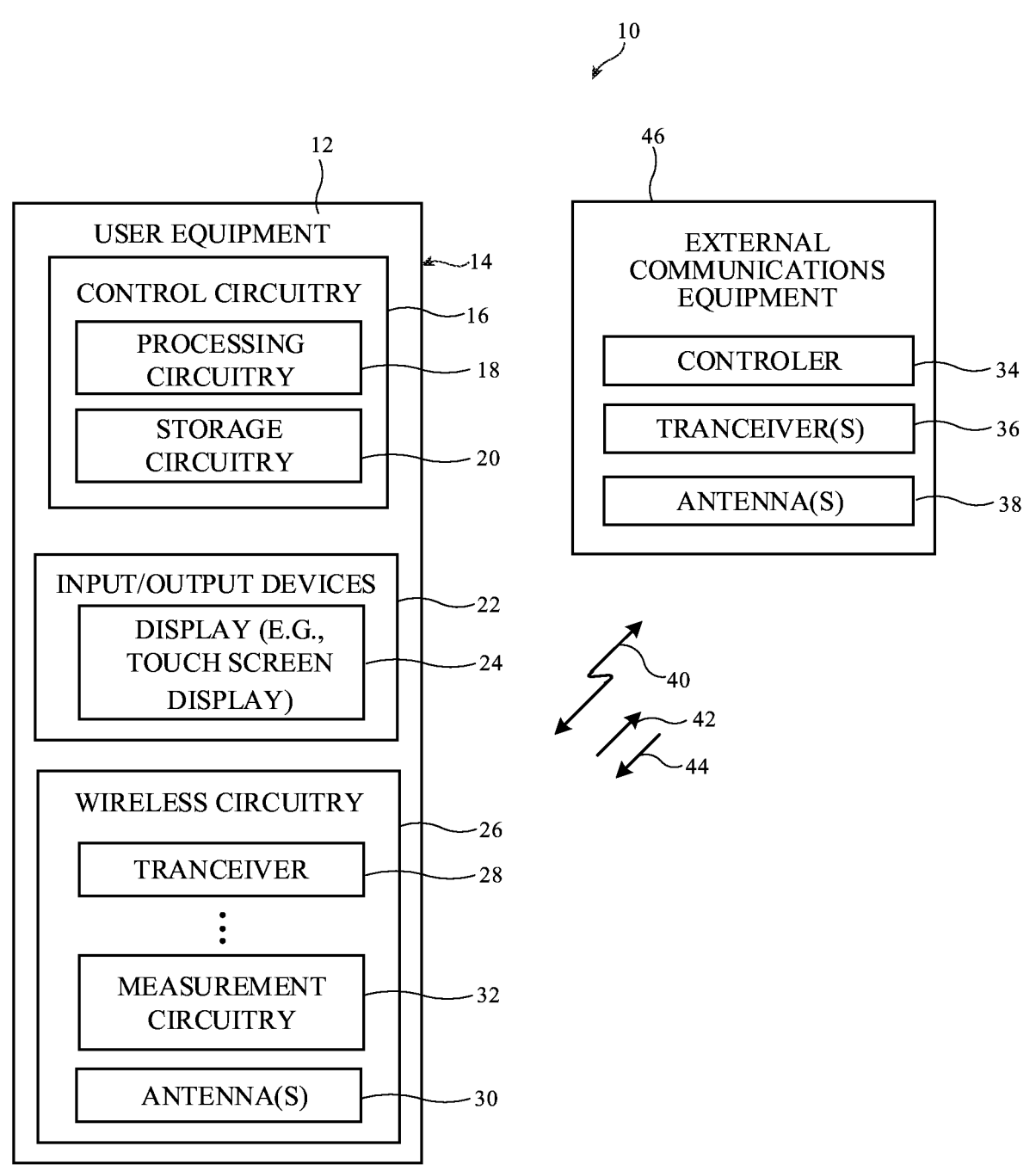
FIG. 1 is a schematic diagram of an illustrative communications system including user equipment that performs wireless communications with external wireless communications equipment in accordance with some embodiments.

FIG. 1 is a schematic diagram of an illustrative communications system 10 (sometimes referred to herein as communications network 10) for conveying wireless data between communications terminals. As shown in FIG. 1, communications system 10 may include network nodes (e.g., communications terminals) such as user equipment (UE) 12 and external communications equipment 46. User equipment 12 and external communications equipment 46 may communicate with each other using a wireless communications link. If desired, user equipment 12 may wirelessly communicate with external communications equipment 46 without passing communications through any other intervening network nodes in communications system 10 (e.g., user equipment 12 may communicate directly with external communications equipment 46 over-the-air).

Communications system 10 may form a part of a larger communications network that includes network nodes coupled to external communications equipment 46 via wired and/or wireless links. The larger communications network may include one or more wired communications links (e.g., communications links formed using cabling such as ethernet cables, radio-frequency cables such as coaxial cables or other transmission lines, optical fibers or other optical cables, etc.), one or more wireless communications links (e.g., short range wireless communications links that operate over a range of inches, feet, or tens of feet, medium range wireless communications links that operate over a range of hundreds of feet, thousands of feet, miles, or tens of miles, and/or long range wireless communications links that operate over a range of hundreds or thousands of miles, etc.), communications gateways, wireless access points, base stations, switches, routers, servers, modems, repeaters, telephone lines, network cards, line cards, portals, user equipment (e.g., computing devices, mobile devices, etc.), etc. The larger communications network may include communications (network) nodes or terminals coupled together using these components or other components (e.g., some or all of a mesh network, relay network, ring network, local area network, wireless local area network, personal area network, cloud network, star network, tree network, or networks of communications nodes having other network topologies), the Internet, combinations of these, etc. User equipment 12 may send data to and/or may receive data from other nodes or terminals in the larger communications network via external communications equipment 46 (e.g., external communications equipment 46 may serve as an interface between user equipment 12 and the rest of the larger communications network). The communications network may, if desired, be operated by a corresponding network operator.

User equipment 12 may be a portable electronic device such as a cellular telephone, a portable media player, a wearable electronic device (e.g., a wristwatch, a pendant, googles or other head-mounted devices, etc.), a laptop computer, a tablet computer, a gaming controller, a remote control, an electronic navigation device, other larger electronic devices such as a desktop computer, television, set-top box, home entertainment system, server, or computer monitor, or may include electronic equipment integrated into a larger system such as a kiosk, building, satellite, or vehicle. External communications equipment 46 may also be a portable electronic device such as a cellular telephone, a portable media player, a wearable electronic device (e.g., a wristwatch, a pendant, googles or other head-mounted devices, etc.), a laptop computer, a tablet computer, a gaming controller, a remote control, an electronic navigation device, other larger electronic devices such as a desktop computer, television, set-top box, home entertainment system, server, or computer monitor, may include electronic equipment integrated into a larger system such as a kiosk, building, satellite, or vehicle, may be a wireless base station, access point, relay station, or gateway, may include two or more of these, etc. Information conveyed between user equipment 12 and external communications equipment 46 may include any desired information (e.g., message data, voice data, application data, image data, video data, email data, webpage data, authentication data such as two-factor authentication codes, real-time chat data, cloud services data, sensor data, etc.).

As shown in FIG. 1, user equipment 12 may include control circuitry 16, input/output devices 22, and wireless circuitry 26. User equipment 12 may include a communications bus and/or other data and control paths (not shown) that couple control circuitry 16 to input/output devices 22 and wireless circuitry 26. Control circuitry 16 may include storage such as storage circuitry 20. Storage circuitry 20 may include volatile memory (e.g., static or dynamic random-access-memory), nonvolatile memory (e.g., flash memory or other electrically-programmable-read-only memory), hard drive storage, etc. Storage circuitry 20 may be integrated within user equipment 12 and/or may include removable storage media. Control circuitry 16 may also include processing circuitry 18. Processing circuitry 18 may control the operation of user equipment 12. Processing circuitry 18 may include one or more application specific integrated circuits, microprocessors, microcontrollers, baseband processor integrated circuits, central processing units, digital signal processors, etc.

Control circuitry 16 may be used to run software on user equipment 12 such as operating system functions, software applications, etc. For example, storage circuitry 20 may store computer code or other software instructions that are executed by processing circuitry 18. The computer code may be stored on a non-transitory computer readable storage medium (e.g., storage such as storage circuitry 20). Control circuitry 16 may also be used in implementing wireless communications protocols (e.g., wireless communications protocols associated with different radio-access technologies that are used to wirelessly convey data over wireless communications links such as a wireless communications link with external communications equipment 46).

Input/output devices 22 are used in providing input to and output from user equipment 12 (e.g., to and/or from an end user of user equipment 12). For example, input/output devices 22 may include one or more displays such as display 24. Display 24 may be a touch sensitive display, a force sensitive display, a display that is both touch sensitive and force sensitive, or a display without touch or force sensor capabilities. Display 24 may be a liquid crystal display, light emitting diode display, organic light emitting diode display, etc. Input/output devices 22 may include other components such as sensors (e.g., light sensors, proximity sensors, range sensors, image sensors, audio sensors such as microphones, force sensors, moisture sensors, temperature sensors, humidity sensors, fingerprint sensors, pressure sensors, touch sensors, ultrasonic sensors, accelerometers, gyroscopes, compasses, etc.), status indicator lights, speakers, vibrators, keyboards, touch pads, buttons, joysticks, etc.

Wireless circuitry 26 may include one or more radio-frequency transceivers 28 and one or more antennas 30 for wirelessly communicating with external communications equipment 46. Transceivers 28 may include one or more transmitters and/or one or more receivers. Antennas 30 may include any desired types of antennas such as patch antennas, dipole antennas, monopole antennas, inverted-F antennas, planar inverted-F antennas, slot antennas, helical antennas, waveguide radiators, combinations of these and/or other types of antennas. Antennas 30 may include one or more phased antenna arrays if desired (e.g., arrays of antenna elements that are sometimes referred to as phased array antennas, where the antenna elements have individually controlled phases and magnitudes that are selected to steer a corresponding signal beam in a particular direction via constructive and destructive interface across each of the antenna elements). Transceivers 28 may be used to transmit and/or receive radio-frequency signals using antennas 30. Transceivers 28 may each be formed from respective integrated circuits or may share one or more integrated circuits. Transceivers 28 may include mixer circuitry, analog-to-digital converter circuitry, digital-to-analog transceiver circuitry, amplifier circuitry, and/or any other desired components for transmitting and/or receiving radio-frequency signals. Wireless circuitry 26 may also include baseband processor circuitry, transmission line structures, filter circuitry, switching circuitry, and/or any other desired circuitry for transmitting and/or receiving wireless radio-frequency signals using antennas 30.

If desired, each transceiver 28 may handle radio-frequency signals using different respective radio access technologies and/or communications band(s). For example, a first transceiver 28 may handle wireless local area network communications, a second transceiver 28 may handle cellular telephone communications, a third transceiver 28 may handle satellite-based communications (e.g., the third transceiver may include a receiver that receives satellite navigation signals such as global positioning system (GPS) signals or that conveys other satellite-based signals), etc. In general, transceivers 28 may be configured to cover (handle) any suitable communications bands of interest. As used herein, the term "convey radio-frequency signals" means the transmission and/or reception of the radio-frequency signals. Antennas 30 may transmit the radio-frequency signals by radiating the radio-frequency signals into free space. Antennas 30 may additionally or alternatively receive the radio-frequency signals from free space. The transmission and reception of radio-frequency signals by antennas 30 each involve the excitation or resonance of antenna currents on antenna resonating elements in the antennas by the radio-frequency signals within the communications band(s) of operation of the antennas.

As shown in FIG. 1, antennas 30 may convey radio-frequency signals 40 with external communications equipment 46 (e.g., for one or more corresponding wireless communications links). The radio-frequency signals 40 that are transmitted from user equipment 12 to external communications equipment 46 (e.g., in uplink direction 42) may sometimes be referred to as uplink signals. The radio-frequency signals 40 that are transmitted from external communications equipment 46 to user equipment 12 (e.g., in downlink direction 44) may sometimes be referred to herein as downlink signals. Radio-frequency signals 40 may convey wireless data (e.g., data organized into datagrams, packets, symbols, messages, etc. according to one or more corresponding communications protocols). Wireless data conveyed by radio-frequency signals 40 in downlink direction 44 may sometimes be referred to as downlink data. Wireless data conveyed by radio-frequency signals 40 in uplink direction 42 may sometimes be referred to herein as uplink data. Radio-frequency signals 40 may be used to perform unidirectional communications (e.g., communications in which wireless data is only sent in uplink direction 42 or downlink direction 44) and/or bidirectional communications (e.g., communications in which wireless data is sent in both uplink direction 42 and downlink direction 44 between user equipment 12 and external communications equipment 46).

External communications equipment 46 may include one or more transceivers 36 that transmit radio-frequency signals 40 in downlink direction 44 using one or more antennas 38 and/or that receive radio-frequency signals in uplink direction 42 using one or more antennas 38. Antennas 38 may include any desired types of antennas such as patch antennas, dipole antennas, monopole antennas, inverted-F antennas, planar inverted-F antennas, slot antennas, helical antennas, waveguide radiators, combinations of these and/or other types of antennas, etc. Antennas 38 may include one or more phased antenna arrays if desired. Transceivers 36 may each be formed from respective integrated circuits or may share one or more integrated circuits. Transceivers 36 may include mixer circuitry, analog-to-digital converter circuitry, digital-to-analog transceiver circuitry, amplifier circuitry, and/or any other desired components for transmitting and/or receiving radio-frequency signals 40. External communications equipment 46 may also include baseband processor circuitry, transmission line structures, filter circuitry, switching circuitry, and/or any other desired circuitry for transmitting and receiving wireless radio-frequency signals using antennas 38.

External communications equipment 46 may include control circuitry such as controller 34. Controller 34 may include processing circuitry and storage circuitry similar to as described above in connection with control circuitry 16 of user equipment 12. Controller 34 may also communicate with other portions of communications system 10 or other nodes or terminals (e.g., other user equipment, servers, the Internet, etc.) of the larger communications network that includes communications system 10 (e.g., using a wired and/or wireless network interface at external communications equipment 46 that is not shown in FIG. 1 for the sake of clarity). External communications equipment 46 may receive downlink data from other portions of the larger communications network for transmission to user equipment 12 using radio-frequency signals 40 (e.g., in downlink direction 44). Similarly, external communications equipment 46 may forward uplink data received from user equipment 12 to other portions of the larger communications network (e.g., to other user equipment, servers, etc.). In this way, external communications equipment 46 may serve as an interface between user equipment 12 and the rest of the larger communications network that includes communications system 10.

Radio-frequency signals 40 may be conveyed by user equipment 12 and external communications equipment 46 (e.g., by transceivers 28 and 36 and antennas 30 and 38) in any desired communications band(s). Control circuitry 16 may control transceivers 28 and controller 34 may control transceivers 36 to format the wireless data in radio-frequency signals 40 according to the communications protocol that corresponds to the communications bands used to convey radio-frequency signals 40. As examples, the communications bands that are used to convey radio-frequency signals 40 may include wireless local area network (WLAN) communications bands (e.g., Wi-Fi® (IEEE 802.11) or other WLAN communications bands) such as a 2.4 GHz WLAN band (e.g., between 2400 and 2480 MHz) and a 5 GHz WLAN band (e.g., between 5180 and 5825 MHz), wireless personal area network (WPAN) communications bands such as the 2.4 GHz Bluetooth® band, 4G LTE bands (e.g., a cellular low band between about 600 to 960 MHz, a cellular low-midband between about 1400 to 1550 MHz, a cellular midband between about 1565 to 1610 MHz, a cellular high band between about 2300 to 2700 MHz, a cellular ultra-high band between about 3400 to 3800 MHz, etc.), GSM bands, UMTS bands, 5G bands (e.g., sub-10 GHz 5G bands and/or 5G bands at frequencies greater than 10 GHz such as frequencies between about 24 and 31 GHz, between about 37 and 40 GHz, and/or around 60-70 GHz), satellite navigation and/or communications bands, an Ultra High Frequency (UHF) band between about 300 MHz and 3 GHz, an L band between about 1 and 2 GHz, an S band between about 2 and 4 GHz, a C band between about 4 and 8 GHz, an X band between about 8 and 12 GHz, a $K_u$ band between about 12 and 18 GHz, a K band between about 18 and 26.5 GHz, a $K_a$ band between about 26.5 and 40 GHz, a V band between about 40 and 75 GHz, a W band between about 75 and 110 GHz, an IEEE 802.15.4 ultra-wideband communications band between about 5 GHz and about 8.5 GHz, and/or any other desired communications bands. Communications bands may sometimes be referred to herein as frequency bands or simply as "bands" and may span corresponding ranges of frequencies.

As shown in FIG. 1, user equipment 12 may include a housing such as housing 14. Housing 14 (sometimes referred to as a case) may be formed of plastic, glass, sapphire, ceramics, fiber composites, metal (e.g., stainless steel, aluminum, alloys, etc.), other suitable materials, or a combination of these materials. In some situations, parts of housing 14 may be formed from dielectric or other low-conductivity material (e.g., glass, ceramic, plastic, sapphire, etc.). In other situations, housing 14 or at least some of the structures that make up housing 14 may be formed from metal elements. Housing 14 may, for example, include opposing first and second faces and peripheral housing structures that run around a substantially rectangular periphery of user equipment 12 and that extend from the first face to the second face. Display 24 may be mounted to the peripheral housing structures at the first face (e.g., display 24 may form some or all of the first face). Housing 14 may include a housing wall (e.g., a rear housing wall) that forms the second face of user equipment 12. This is merely illustrative and, in general, user equipment 14 may have other form factors.

In practice, the antennas 38 on external communications equipment 46 may exhibit a corresponding coverage area (e.g., a finite coverage area determined by the structure and arrangement of antennas 38 and the wireless transmit power produced by wireless communications equipment 46). Within the coverage area, antennas 38 may be capable of conveying radio-frequency signals with a satisfactory level of radio-frequency performance. However, outside of the coverage area, antennas 38 may be unable to convey radio-frequency signals or may convey the radio-frequency signals with an unsatisfactory level of radio-frequency performance.

When user equipment 12 is located within the coverage area of antennas 38, user equipment 12 may perform wireless communications with external communications equipment 46 with a satisfactory level of radio-frequency performance (e.g., with a satisfactory wireless link or signal quality). If user equipment 12 moves outside of the coverage area, wireless circuitry 26 may be unable to perform wireless communications with external communications equipment 46 or may be unable to perform wireless communications with satisfactory wireless link quality. This may prevent user equipment 12 from being able to communicate with the rest of the larger communications network via external communications equipment 46. This may be particularly detrimental in scenarios where the user of user equipment 12 has an emergency or otherwise needs to communicate with other nodes of the larger communications network (e.g., using a voice call, video call, text message, email message, application data, etc.) but user equipment 12 has moved outside of the coverage area of external communications equipment 46.

To mitigate these risks, user equipment 12 may track and record the wireless coverage provided by external communications equipment 46 over time. For example, wireless circuitry 26 may include sensor circuitry such as measurement circuitry 32. Measurement circuitry 32 may gather wireless performance metric data associated with the radio-frequency signals 40 transmitted by external communications equipment 46 (e.g., in downlink direction 44). The wireless performance metric data may include, as examples, received power level values, receiver sensitivity values, frame error rate values, bit error rate (BER) values, block error rate values (BLER), other error rate values, received signal strength indicator (RSSI) values, adjacent channel leakage ratio (ACLR) or other spectral measurement values, error vector magnitude (EVM) values, received signal code power (RSCP) information, reference symbol received power (RSRP) information, signal-to-interference ratio (SINR) values, signal-to-noise ratio (SNR) values, Ec/IO data, Ec/No data, and/or other data gathered from the downlink signals transmitted by external communications equipment 46. If desired, the gathered wireless performance metric data may additionally or alternatively include information on whether responses (acknowledgements) corresponding to requests from user equipment 12 are being received at external communications equipment 46, information on whether a network access procedure has succeeded, information about how many re-transmissions are being requested between user equipment 12 and external communications equipment 46, information on whether a loss of signaling message has been received, information on whether paging signals have been successfully received, and/or any other information that is reflective of the wireless link or signal quality of radio-frequency signals 40.

In order to track and record the wireless coverage provided by external communications equipment 46 over time, measurement circuitry 32 may also record the geographic location of user equipment 12 where each wireless performance metric data value was gathered. Measurement circuitry 32 may identify the geographic location of user equipment 12 based on satellite navigation signals (e.g., global positioning system (GPS) signals and/or global navigation satellite system (GLONASS)) received by antennas 30 and transceivers 28, for example. If desired, measurement circuitry 32 may additionally or alternatively use other sensor data such as accelerometer data, orientation sensor data, gyroscope data, compass data, image sensor data, spatial ranging data (e.g., radio-frequency spatial ranging data gathered using antennas 30 at frequencies such as frequencies greater than 10 GHz), angle-of-arrival data and range data gathered using antennas 30 under a IEEE 802.15.4 ultra-wideband communications protocol, received signal strength data, and/or any other desired sensor data to identify the geographic location of user equipment 12. In this way, user equipment 12 may have knowledge of the geographic locations at which user equipment 12 was previously able to perform radio-frequency communications with external communications equipment 46 with satisfactory wireless link quality. Similarly, user equipment 12 may have knowledge of the geographic locations at which user equipment 12 was unable to perform satisfactory radio-frequency communications with external communications equipment 46.

Figure 2:
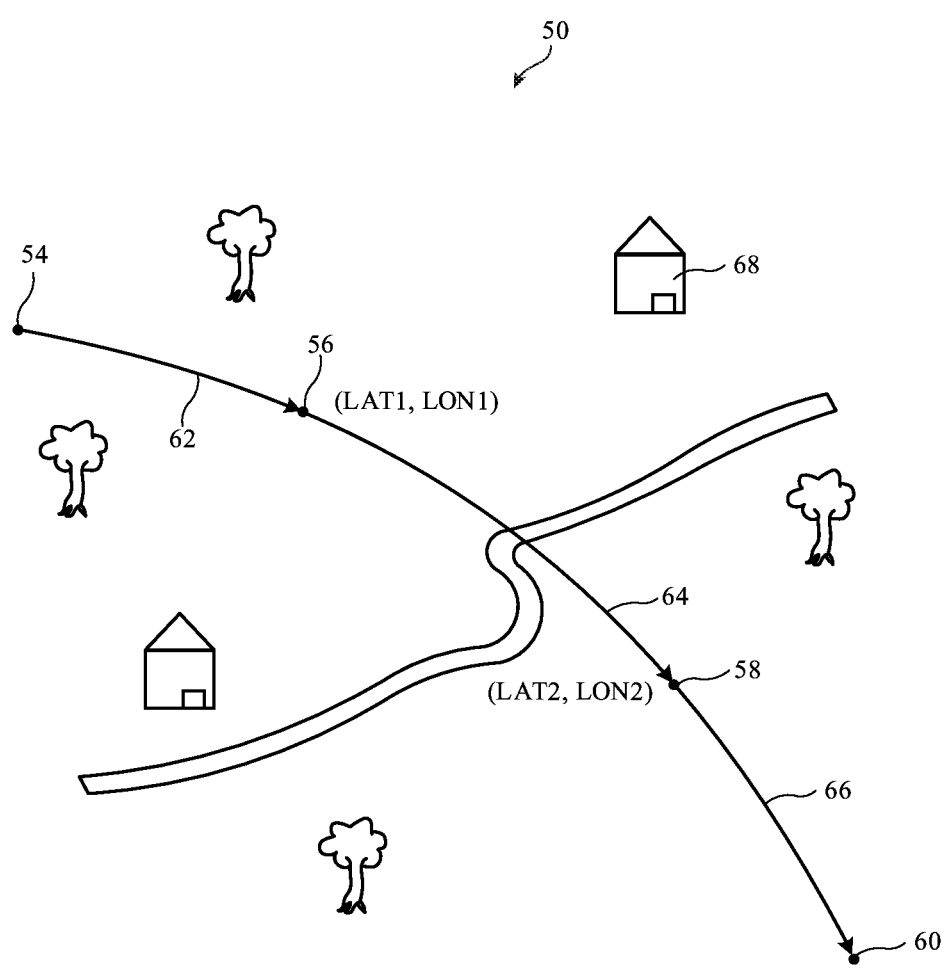
FIG. 2 is a diagram of an illustrative geographic area through which user equipment may move while performing wireless communications with external wireless communications equipment in accordance with some embodiments.

FIG. 2 is a diagram of an exemplary geographic area through which user equipment 12 may move while communicating with external communications equipment 46. As shown in FIG. 2, user equipment 12 may initially be at location 54 within geographic area 50 (sometimes referred to herein as geographic region 50). External communications equipment 46 may be located elsewhere within geographic area 50 (e.g., within or on a building such as building 68, outside, on a cellular tower, in the hand or pocket of another user, in a moving vehicle, etc.), may be overlapping geographic area 50 (e.g., overhead), or may be located outside of geographic area 50 (e.g., in an adjacent geographic area, overhead an adjacent geographic area, or within or overhead a non-adjacent geographic area to geographic area 50). Geographic area 50 may include land, water, a combination of land and water, an urban area, a rural area, a suburban area, a combination of urban, rural, and/or suburban areas, etc.

At location 54, user equipment 12 may convey or attempt to convey radio-frequency signals 40 with external communications equipment 46 (FIG. 1). Over time, measurement circuitry 32 on user equipment 12 may continuously or periodically gather wireless performance metric data associated with radio-frequency signals 40. User equipment 12 may identify the location(s) of user equipment 12 within geographic area 50 where the wireless performance metric data was gathered. Over time, the user of user equipment 12 and thus user equipment 12 may move along path 62 to location 56 within geographic area 50. Location 56 may be identified by geographic coordinates such as latitude value LAT1 and longitude value LON1 (e.g., location 56 may be at coordinates (LAT1,LON1) on Earth). User equipment 12 may identify that user equipment 12 is located at coordinates (LAT1,LON1) when user equipment 12 is at location 56. The use of latitude and longitude values to identify the location of user equipment 12 is merely illustrative and, in general, any desired location coordinate system may be used to identify the geographic location of user equipment 12.

The user and thus user equipment 12 may then move along path 64 to location 58. User equipment 12 may identify that user equipment 12 has a latitude value LAT2 and a longitude value LON2 at location 58 (e.g., location 58 may be at coordinates (LAT2,LON2) on Earth). The user and thus user equipment 12 may then move along path 66 to location 60. Paths 62, 64, and 66 may collectively describe the path traveled by user equipment 12 from location 54 to location 60 within geographic area 50. Paths 62, 64, and 66 may run along a road, highway, path, walkway, trail, waterway, airway, undeveloped areas without paths, trails, or roadways, an interior corridor (e.g., geographic area 50 need not be confined to the outdoors), and/or any other desired paths within geographic area 50, as just a few examples.

Figure 3:
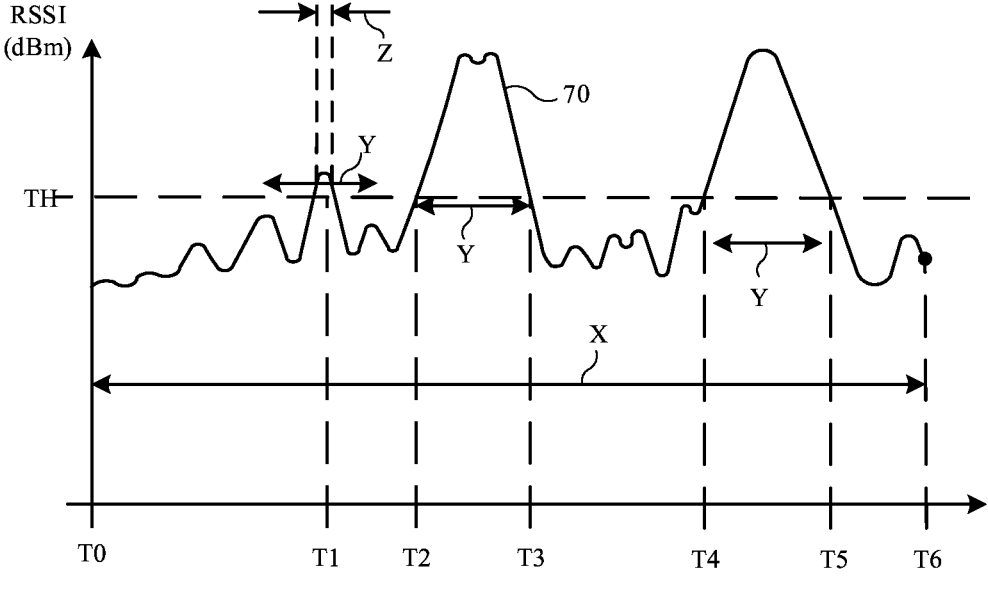
FIG. 3 is a plot of illustrative wireless performance metric data (Receive Signal Strength Indicator (RSSI) values) as a function of time gathered by user equipment as the user equipment moves through a geographic area in accordance with some embodiments.

User equipment 12 may continue to convey or attempt to convey radio-frequency signals 40 with external communications equipment 46 as the user equipment moves from location 54 to location 60. User equipment 12 may continuously or periodically gather wireless performance metric data and corresponding location information at locations 54, 56, 58, and 60 and along paths 62, 64, and 66. FIG. 3 is a plot of exemplary wireless performance metric data that may be gathered by measurement circuitry 32 while user equipment 12 traverses geographic area 50 from location 54 to location 60 of FIG. 2.

As shown in FIG. 3, curve 70 plots RSSI values that may be gathered by measurement circuitry 32 over time while user equipment 12 moves through geographic area 50 from location 54 to location 60 of FIG. 2. The example of FIG. 3 is merely illustrative and, in general, curve 70 may plot any desired wireless performance metric data. Curve 70 may have other shapes.

As shown by curve 70, at time T0, user equipment 12 may gather an RSSI value from downlink signals transmitted by external communications equipment 46. The RSSI value gathered at time T0 is less than threshold RSSI value TH. Threshold RSSI value TH may be determined by industry, regulatory, or manufacturer standards, may be predetermined during calibration, design, manufacture, and/or testing of user equipment 12, etc. Threshold RSSI value TH may, for example, define the minimum RSSI value necessary for user equipment 12 to be able to decode the wireless data within the downlink signals transmitted by external communications equipment 46. Because the RSSI value gathered at time T0 is less than threshold RSSI value TH, user equipment 12 may be unable to decode the wireless data in the downlink signals. User equipment 12 may therefore identify that there is unsatisfactory or insufficient wireless link quality between user equipment 12 and external communications equipment 46 at location 54.

Between times T0 and T2, user equipment 12 travels along path 62 of FIG. 2 to location 56 (e.g., user equipment 12 may be at location 56 in geographic area 50 between time T2 and a subsequent time T3). Between times T0 and T1, the RSSI values gathered by user equipment 12 are less than threshold RSSI value TH. At time T1, the RSSI values gathered by user equipment 12 exceed threshold RSSI value TH for a time period Z. While the measured RSSI value exceeds threshold RSSI value TH at time T1, time period Z may still be too short for user equipment 12 to decode the wireless data in the downlink signals transmitted by external communications equipment 46. User equipment 12 may therefore identify that there is unsatisfactory or insufficient wireless link quality between user equipment 12 and external communications equipment 46 at the location of user equipment 12 at time T1.

However, between times T2 and T3, user equipment 12 may gather RSSI values that exceed threshold RSSI value TH for a time period of duration Y that is greater than time period Z. Duration Y may be sufficiently long such that user equipment 12 is able to properly decode the wireless data in the downlink signals transmitted by external communications equipment 46. User equipment 12 may therefore identify that there is satisfactory wireless link quality between user equipment 12 and external communications equipment 46 at the location of user equipment 12 between times T2 and T3 (e.g., at location 56 having latitude value LAT1 and longitude value LON1 of FIG. 2). User equipment 12 may record location 56 (e.g., coordinates (LAT1,LON1)) in storage circuitry 20 (FIG. 1) as a location at which user equipment 12 was able to perform satisfactory wireless communications with external communications equipment 46 (e.g., a location at which there is satisfactory wireless link quality between user equipment 12 and external communications equipment 46).

Duration Y may, for example, be a predetermined minimum duration (time period) during which the measured RSSI values need to exceed threshold RSSI value TH in order for user equipment 12 to be able to satisfactorily decode the wireless data in the downlink signals transmitted by external communications equipment 46. Duration Y may be determined by industry, regulatory, or manufacturer standards, may be predetermined during calibration, design, manufacture, and/or testing of user equipment 12, etc. As examples, duration Y may be 5 seconds, 4 seconds, between 4 and 6 seconds, 3 seconds, between 3 and 6 seconds, at least 3 seconds, at least 2 seconds, at least 4 seconds, at least 5 seconds, at least 6 seconds, between 1 and 10 seconds, etc.

Between time T3 and T4, the user and thus user equipment 12 move along path 64 to location 58 in geographic area 50 (e.g., user equipment 12 may be at location 58 in geographic area 50 between time T4 and a subsequent time T5). Between times T3 and T4, the RSSI values gathered by user equipment 12 are less than threshold RSSI value TH. However, between times T4 and T5, user equipment 12 may gather RSSI values that exceed threshold RSSI value TH for a time period that is greater than duration Y (e.g., the minimum time period associated with satisfactory decoding of the wireless data transmitted by external communications equipment 46). User equipment 12 may therefore identify that there is satisfactory wireless link quality between user equipment 12 and external communications equipment 46 at the location of user equipment 12 between times T4 and T5 (e.g., at location 58 having latitude value LAT2 and longitude value LON2 of FIG. 2). User equipment 12 may record location 58 (e.g., coordinates (LAT2,LON2)) in storage circuitry 20 (FIG. 1) as a location at which user equipment 12 was able to perform satisfactory wireless communications with external communications equipment 46 (e.g., a location at which there is satisfactory wireless link quality between user equipment 12 and external communications equipment 46).

Between time T5 and T6, the user and thus user equipment 12 move along path 66 to location 60 in geographic area 50 (e.g., user equipment 12 may be at location 60 in geographic area 50 at time T6). Between times T5 and T6 and at time T6, the RSSI values gathered by user equipment 12 are less than threshold RSSI value TH. User equipment 12 may therefore be unable to perform wireless communications with external communications equipment 46 when user equipment is located at location 60.

Nevertheless, the user of user equipment 12 may need to be able to communicate with external communications equipment 46 and/or the rest of the larger communications network while user equipment 12 is at location 60. For example, the user may have an emergency while at location 60 and may need to urgently contact the relevant authorities (e.g., medical services, rescue services, law enforcement, etc.). However, the poor signal quality at location 60 may prevent the user from being able to successfully contact the relevant authorities at location 60. In user equipment without wireless coverage tracking capabilities, the user equipment would have no knowledge of where to go to obtain satisfactory wireless coverage from external communications equipment 46. The user would then have no choice but to spend an unnecessarily long amount of time physically roaming through geographic area 50 until suitable wireless coverage is found for the user equipment to contact the relevant authorities.

However, user equipment 12 has knowledge of the previous locations at which user equipment 12 had satisfactory wireless coverage (e.g., at locations 56 and 58 of FIG. 2). User equipment 12 may therefore provide output to the user of user equipment 12 that directs the user to travel (e.g., with the user equipment) to one of the previous locations at which user equipment 12 had satisfactory wireless coverage from external communications equipment 46. As an example, display 24 (FIG. 1) may be used to display a map or directions from the user's present location (e.g., location 60)

to one or both of locations 56 and 58 within geographic area 50. This may allow the user to find the closest location(s) to location 60 at which user equipment 12 previously had satisfactory wireless coverage, thereby allowing the user to travel back to those locations, where the user equipment would be highly likely to once again be able to communicate with the external communications equipment with satisfactory wireless link quality. This would allow the user to quickly travel back to one of these locations (e.g., locations 56 and 58) to contact the relevant authorities in a minimal amount of time, without needing to roam geographic area 50 randomly and without requiring the user to actively monitor and remember where the user equipment last had satisfactory wireless coverage.

Use of the wireless coverage tracking capabilities of user equipment 12 is not limited to emergency situations. For example, the user of user equipment 12 may simply desire to make a telephone or video call at location 60. Similarly, an application may be running on user equipment 12 that requires high speed internet connectivity while the user is at location 60. In these scenarios, the wireless coverage at location 60 may be insufficient to meet the user's needs or the needs of the applications running on user equipment 12. While at location 60, the user may provide a user input or the application may produce a call that controls user equipment 12 to identify locations 56 and 58 to the user, thereby allowing the user to return to locations 58 or 56 to communicate with external communications equipment 46 with satisfactory wireless link quality.

In some examples, user equipment 12 may store all previous locations at which user equipment 12 previously had sufficient wireless coverage from external communications equipment 46. In other examples, user equipment 12 may store only some of the locations at which user equipment 12 previously had sufficient wireless coverage. Storing only a subset of these locations may minimize the amount of storage required on user equipment 12. As an example, user equipment 12 may store a predetermined number of the most recent locations at which user equipment 12 had satisfactory wireless coverage. As another example, user equipment 12 may store all locations at which user equipment 12 had satisfactory wireless coverage within a moving time window X (e.g., a time window of a fixed duration immediately preceding any given moment). The duration of time window X may be determined by industry, regulatory, or manufacturer standards, may be predetermined during calibration, design, manufacture, and/or testing of user equipment 12, etc. Time window X may be, for example, 30 minutes, 45 minutes, 1 hour, 20 minutes, between 20 and 40 minutes, between 10 minutes and 1 hour, greater than 1 hour, greater than 20 minutes, less than 1 hour, less than 45 minutes, etc. If desired, user equipment 12 may retain one or more previous locations at which user equipment 12 had satisfactory wireless coverage (e.g., without deleting the locations from memory) when no locations had satisfactory wireless coverage during the time window X immediately preceding a given moment. This may ensure that the user equipment will still be able to direct the user to a location having satisfactory coverage even if it has been greater than time window X since such a location was found.

FIG. 4 is a flow chart of illustrative steps that may be performed by user equipment 12 to ensure that the user equipment is able to communicate with external communications equipment 46 even when the user equipment has moved outside of the coverage area of the external communications equipment. At step 80, user equipment 12 may begin receiving radio-frequency signals 40 in one or more communications bands from external communications equipment 46.

At step 82, measurement circuitry 32 may gather wireless performance metric data from the downlink signals transmitted by external communications equipment 46 (e.g., user equipment 12 may begin gathering RSSI values to produce curve 70 of FIG. 3). User equipment 12 may gather corresponding location data indicative of the location at which the wireless performance metric data was gathered by user equipment 12. For example, measurement circuitry 32 may identify the longitude and latitude coordinates of user equipment 12 for each RSSI value. Processing may proceed to step 82 from step 80 automatically, in response to a user input at user equipment 12, and/or in response to an application call by control circuitry 16. For example, the user may press a button via display 24 or otherwise provide user input to instruct user equipment 12 to begin gathering the wireless performance metric data.

At optional step 84, user equipment 12 may gather supplemental sensor data. As one example, the supplemental sensor data may include sensor data indicative of whether user equipment 12 is inside of a vehicle such as a car. For example, user equipment 12 may identify that user equipment 12 is inside a car if wireless circuitry 26 has connected to a vehicular Bluetooth speaker system, if an accelerometer on user equipment 12 indicates that user equipment 12 is traveling faster than a predetermined speed, if user equipment 12 has interfaced with a vehicular operating system, etc. The supplemental sensor data may additionally or alternatively include information indicative of whether user equipment 12 is located in a user's pocket or backpack or in a user's hand (e.g., ambient light sensor data, proximity sensor data, orientation sensor data, grip sensor data associated with display 24, impedance sensor data, etc.). If desired, the supplemental sensor data may be used in subsequent processing of the wireless performance metric data gathered by measurement circuitry 32.

At step 86, control circuitry 16 may determine whether the gathered wireless performance metric data exceeds a wireless performance metric data threshold value for at least a continuous predetermined time period. For example, control circuitry 16 may determine whether the gathered RSSI values exceed threshold RSSI value TH for at least a continuous duration Y (FIG. 3). If desired, control circuitry 16 may optionally determine whether the threshold has been exceeded for the predetermined time period based at least in part on the supplemental sensor data gathered while processing step 84. For example, control circuitry 16 may adjust or fine-tune the wireless performance metric data threshold value (e.g., threshold RSSI value TH), the predetermined time period (e.g., duration Y), and/or time window X based on the supplemental sensor data. Control circuitry 16 may, if desired, disable performance metric data recording based on the supplemental sensor data.

If the gathered wireless performance metric data does not exceed the wireless performance metric data threshold value for at least the predetermined time period (e.g., for the RSSI values gathered between times T0 and T2 of FIG. 3), processing may loop back to step 82 via path 88 and user equipment 12 may continue to gather wireless performance metric data (and corresponding location data) as user equipment 12 moves over time. If the gathered wireless performance metric data exceeds the wireless performance metric data threshold value for at least the predetermined time period (e.g., for the RSSI values gathered at location 56 of FIG. 3), processing may proceed to step 92 via path 90.

At step 92, user equipment 12 may record, in storage circuitry 20 (FIG. 1), the location data corresponding to the wireless performance metric data that exceeded the wireless performance metric data threshold value for at least the predetermined time period. For example, user equipment 12 may record (store) the latitude value LAT1 and the longitude value LON1 of location 56 in storage circuitry 20 at or after time T3 of FIG. 3. This may allow user equipment 12 to keep track of the location 56 where user equipment 12 had satisfactory wireless coverage from external communications equipment 46.

In the absence of a suitable trigger condition, processing may loop back to step 82 via path 100 and user equipment 12 may continue to gather wireless performance metric data (and corresponding location data) as user equipment 12 moves over time. If control circuitry 16 detects the trigger condition, processing may proceed to step 96 via path 94 instead of looping back to step 82. As an example, the trigger condition may be a user input provided to user equipment 12 indicating that the user desires to find a location with satisfactory wireless coverage. The user input may be provided through display 24 (e.g., a button displayed by a graphical user interface at display 24) or through a dedicated button on user equipment 12 (e.g., a physical button that is not part of display 24). The user may provide such a user input when the user needs to be able to communicate with external communications equipment 46 or other portions of the larger communications network but the user is at a location where there is unsatisfactory wireless coverage from external communications equipment 46. For example, the user may provide the user input when the user is at location 60 of FIG. 2 and the user has an emergency and needs to contact the relevant authorities, the user needs to make a voice or video call, the user needs to use an application that requires high speed data transfer from the Internet, etc. This is merely illustrative and, if desired, the trigger condition may be satisfied without user input. For example, applications running on user equipment 12 may autonomously issue an application call instructing control circuitry 16 to proceed to step 96, the application may autonomously require an internet connection with a data rate greater than what the wireless coverage at location 60 can provide, etc.

At step 96, user equipment 12 may take appropriate action in response to the detected trigger condition (e.g., user equipment 12 may notify the user and/or applications running on user equipment 12 of one or more previous locations where user equipment 12 had satisfactory wireless coverage). For example, user equipment 12 may display a visual indicator such as a map (e.g., a visual map in a graphical user interface produced on display 24 by a navigation or map application running on control circuitry 16). The map may show one or more (e.g., all) of the locations recorded while processing step 92, may display directions (e.g., on display 24, on the map displayed on display 24, etc.) that direct the user from their current location to one or more (e.g., all) of the locations recorded while processing step 92, may issue an audible, visual, and/or haptic alert to the user, may provide voice or audio directions that direct the user from their current location to one or more (e.g., all) of the locations recorded while processing step 92, etc. This may allow the user to return to a previous location having satisfactory wireless coverage so the user can communicate with external communications equipment 46 (e.g., with satisfactory wireless link quality) without having to roam geographic area 50 randomly until satisfactory wireless coverage is found.

If desired, user equipment 12 may share the locations recorded while processing step 92 with other user equipment (e.g., via local wireless links such as Bluetooth or wireless local area network links, via external communications equipment 46 and/or the rest of the larger communications network once user equipment 12 has moved to a location having satisfactory wireless coverage, etc.). This may, for example, allow the other user equipment to have knowledge of the locations with satisfactory wireless coverage in case the other user equipment is ever located in geographic area 50 and needs to find an area of satisfactory wireless coverage (e.g., in an emergency scenario).

At optional step 98, user equipment 12 may periodically delete the location data recorded while processing step 92. For example, user equipment 12 may delete the stored location data older than moving time window X, after a predetermined time period, etc. If desired, user equipment 12 may retain the stored location data that is older than time window X if no location data was stored while processing step 92 during time window X. Processing may subsequently loop back to step 82 via paths 102 and 100. User equipment 12 may subsequently continue to gather wireless performance metric data (and corresponding location data) as user equipment 12 moves over time.

The steps of FIG. 4 are merely illustrative. If desired, the steps of FIG. 4 may be performed in other orders and/or two or more of the steps of FIG. 4 may be performed concurrently. If desired, user equipment 12 may forgo identification of the location of user equipment 12 until the predetermined wireless performance metric data threshold value has been exceeded for the predetermined time period (e.g., to save power, user equipment 12 need not identify the location of user equipment 12 until processing step 92).

If desired, user equipment 12 may adjust the transmission of reverse datagrams based on the gathered wireless performance metric data. FIG. 5 is a flow chart of illustrative steps that may be performed by user equipment 12 in adjusting the transmission of reverse datagrams based on the gathered wireless performance metric data. The steps of FIG. 5 may be performed instead of or in addition to the steps of FIG. 4. In scenarios where the steps of FIG. 5 are performed in addition to the steps of FIG. 4, the steps of FIG. 5 may be performed before, after, and/or concurrently with the steps of FIG. 4.

At step 110, user equipment 12 may begin receiving the downlink signals transmitted by external communications equipment 46 in one or more communications bands.

At step 112, measurement circuitry 32 on user equipment 12 may gather wireless performance metric data from the downlink signals transmitted by external communications equipment 46 (e.g., user equipment 12 may begin gathering RSSI values to produce curve 70 of FIG. 3).

At step 114, control circuitry 16 may determine whether the gathered wireless performance metric data exceeds a wireless performance metric data threshold value for at least a continuous predetermined time period. For example, control circuitry 16 may determine whether the gathered RSSI values exceed threshold RSSI value TH for at least time period Z (FIG. 3). If desired, time period Z may be shorter than the duration Y associated with the successful decoding of received downlink data. Time period Z may be determined by industry, regulatory, or manufacturer standards, may be predetermined during calibration, design, manufacture, and/or testing of user equipment 12, etc. As an example, time period Z may be 2 seconds, 1 second, less than 2 seconds, less than 3 seconds, less than 4 seconds, less than 1 second, or any other desired time period less than or equal to duration Y.

If the gathered wireless performance metric data does not exceed the wireless performance metric data threshold value for at least the continuous predetermined time period (e.g., if the gathered RSSI values do not exceed threshold RSSI value TH for at least time period Z), processing may proceed to step 118 via path 116.

At step 118, transceiver 28 on user equipment 12 may forego transmission of reverse datagrams to external communications equipment 46 or may transmit reverse datagrams with a relatively low duty cycle DRX (e.g., with a relatively long time period between transmission of each of the reverse datagrams). Datagrams are the smallest transfer unit in digital communications over a packet-switched network, and are typically a few bytes in size (e.g., smaller than data packets). Reverse datagrams are datagrams transmitted by user equipment 12 to external communications equipment 46.

In the example of FIG. 3, user equipment 12 may forgo reverse datagram transmission or may transmit reverse datagrams with a relatively low duty cycle DRX between time periods T0 and T1, between time periods T1 and T2, between time periods T3 and T4, and after time period T5 (e.g., because curve 70 does not exceed threshold RSSI value TH for duration Z during these periods). Foregoing or slowing transmission of the reverse datagrams in this way may serve to save power and battery level in user equipment 12, given that there is relatively low probability of external communications equipment 46 successfully receiving the reverse datagrams during these periods. Processing may subsequently loop back to step 112 via path 120.

If the gathered wireless performance metric data exceeds the wireless performance metric data threshold value for at least the continuous predetermined time period (e.g., if the gathered RSSI values exceed threshold RSSI value TH for at least time period Z), processing may proceed to step 124 via path 122. At step 124, transceiver 28 on user equipment 12 may transmit a burst of reverse datagrams to external communications equipment 46. The burst of reverse datagrams may involve transmission of the reverse datagrams with a relatively high duty cycle DRX (e.g., with a relatively short time period between transmission of each of the reverse datagrams).

In the example of FIG. 3, user equipment 12 may transmit bursts of reverse datagrams at time T1, between times T2 and T3, and between times T4 and T5 (e.g., because curve 70 exceeds threshold RSSI value TH for duration Z at these times). The burst of reverse datagrams may, for example, include datagrams that would otherwise have been sent during the time periods where user equipment 12 had unsatisfactory wireless coverage (e.g., between times T0 and T1, between times T1 and T2, between times T3 and T4, and after time T5 of FIG. 3). Because user equipment 12 has satisfactory wireless coverage when the gathered RSSI values exceed the threshold RSSI value TH for at least predetermined time period Z, there is a relatively high probability that external communications equipment 46 will successfully receive each of the reverse datagrams in the burst during these time periods. In this way, user equipment 12 may save power and battery as user equipment 12 traverses geographic area 50. Processing may subsequently loop back to step 112 via path 126. Two or more of the steps of FIG. 5 may be performed concurrently if desired.

Figure 6:
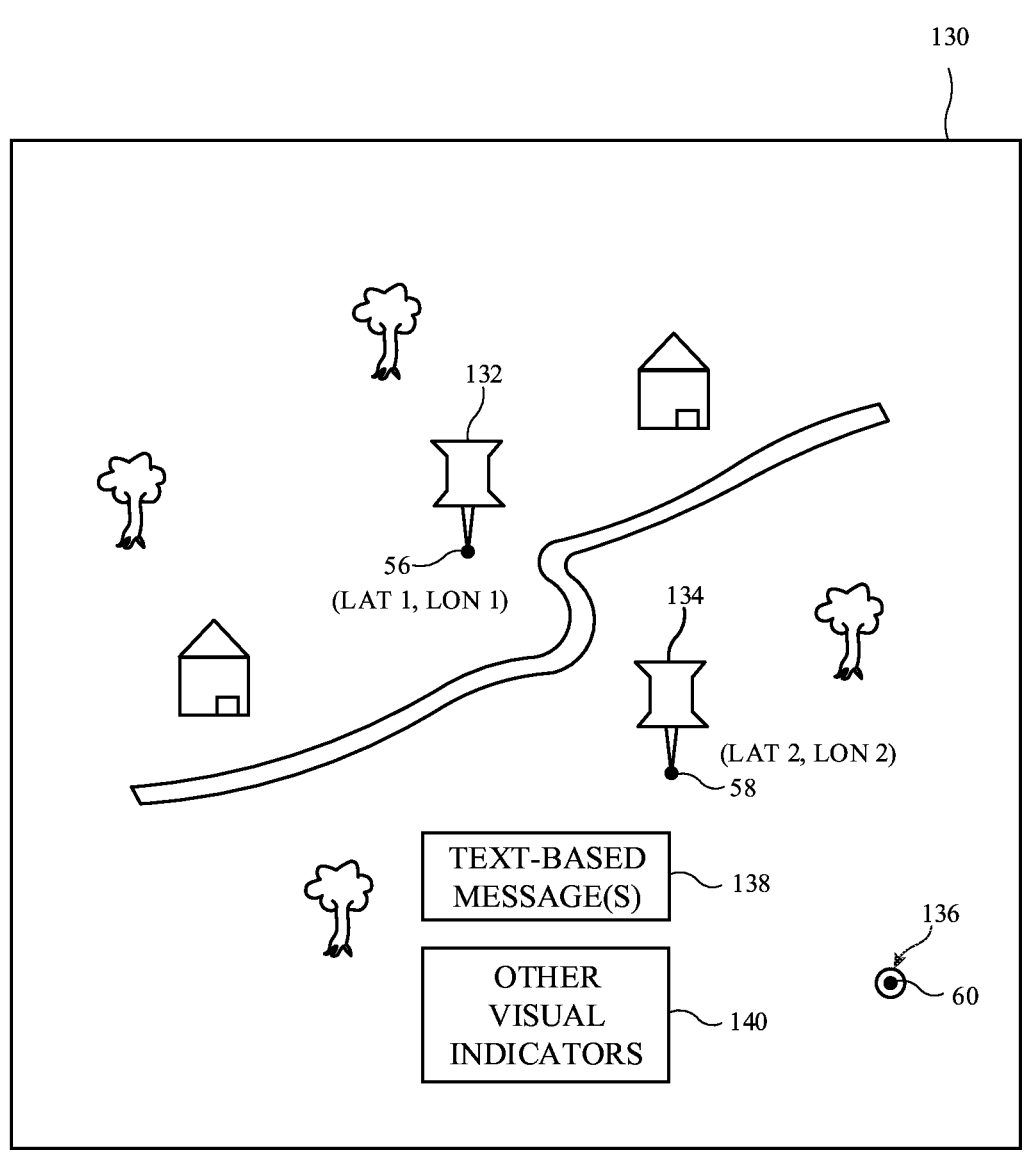
FIG. 6 is a diagram of an illustrative graphical user interface that may be generated by user equipment to identify, to a user, previous locations at which the user equipment was able to perform satisfactory wireless communications with external wireless communications equipment in accordance with some embodiments.

FIG. 6 shows an example of a graphical user interface that may be displayed on display 24 while processing step 96 of FIG. 4. As shown in FIG. 6, a graphical user interface (GUI) such as graphical user interface 130 may be displayed on display 24 (e.g., by software such as a navigation or map application running on control circuitry 16). In the example of FIG. 6, graphical user interface 130 displays a map of geographic area 50 (FIG. 2) after the user and user equipment 12 have already traveled to location 60 via locations 54, 56, and 58 and via paths 62, 64, and 66 (e.g., while also gathering wireless performance metric data such as the RSSI values given by curve 70 of FIG. 3).

Graphical user interface 130 may identify the present location 60 of user equipment 12 via graphical indicator (icon) 136. Graphical user interface 130 may identify one or both of the recorded locations 56 and 58 where user equipment 12 had satisfactory wireless coverage from external communications equipment 46. For example, graphical user interface 130 may display a first icon 132 identifying location 56 and a second icon 134 identifying location 58 on the map. If desired, graphical user interface 130 may also display the latitude and longitude coordinates of locations 56 and 58. Icons 132 and 134 may be pin-shaped icons, stars, circles, moving icons, or any other desired visual indicators to identify locations 56 and 58 to the user. In another suitable arrangement, graphical user interface 130 may identify only the closest location to the present location 60 of user equipment 12 (e.g., graphical user interface 130 may display only icon 134 for location 58). In this example, if the user travels to location 58 and still does not have satisfactory wireless coverage, graphical user interface 130 may then display icon 132 identifying location 56.

If desired, graphical user interface 130 may display one or more text-based messages 138. Text-based messages 138 may include an alert or prompt for the user to select (e.g., by pressing on display 24 or via other user input devices) to open a navigation or map application so the user can then use the application to navigate to locations 56 and/or 58. Text-based messages 138 may additionally or alternatively include directions (e.g., turn-by-turn directions) presented on display 24 that direct the user to locations 58 and/or 56. The directions may, if desired, by overlaid with a graphical map of geographic area 50 (e.g., as shown in FIG. 6). Text-based messages 138 may additionally or alternatively include an indicator that the user equipment is in an emergency mode or an operating mode in which the user equipment is attempting to direct the user to a location with satisfactory wireless coverage. These examples are merely illustrative and, in general, any desired text-based messages may be included in text-based messages 138 or text-based messages 138 may be omitted.

Graphical user interface 130 may additionally or alternatively display other visual indicators 140. Other visual indicators 140 may include buttons, status indicators, icons, lines, arrows (e.g., arrows that actively and dynamically point the user towards location 58 and/or location 56 while the user views display 24), a graphical route or path, images, videos, or any other desired visual content displayed on display 24. Other visual indicators 140 may be static and/or animated. The example of FIG. 6 is merely illustrative. Any desired visual indicators may be used to help the user return to locations 58 and/or 56. Other feedback (e.g., audio feedback, haptic feedback, etc.) may be provided in addition to or instead of visual indicators.

Figure 7:
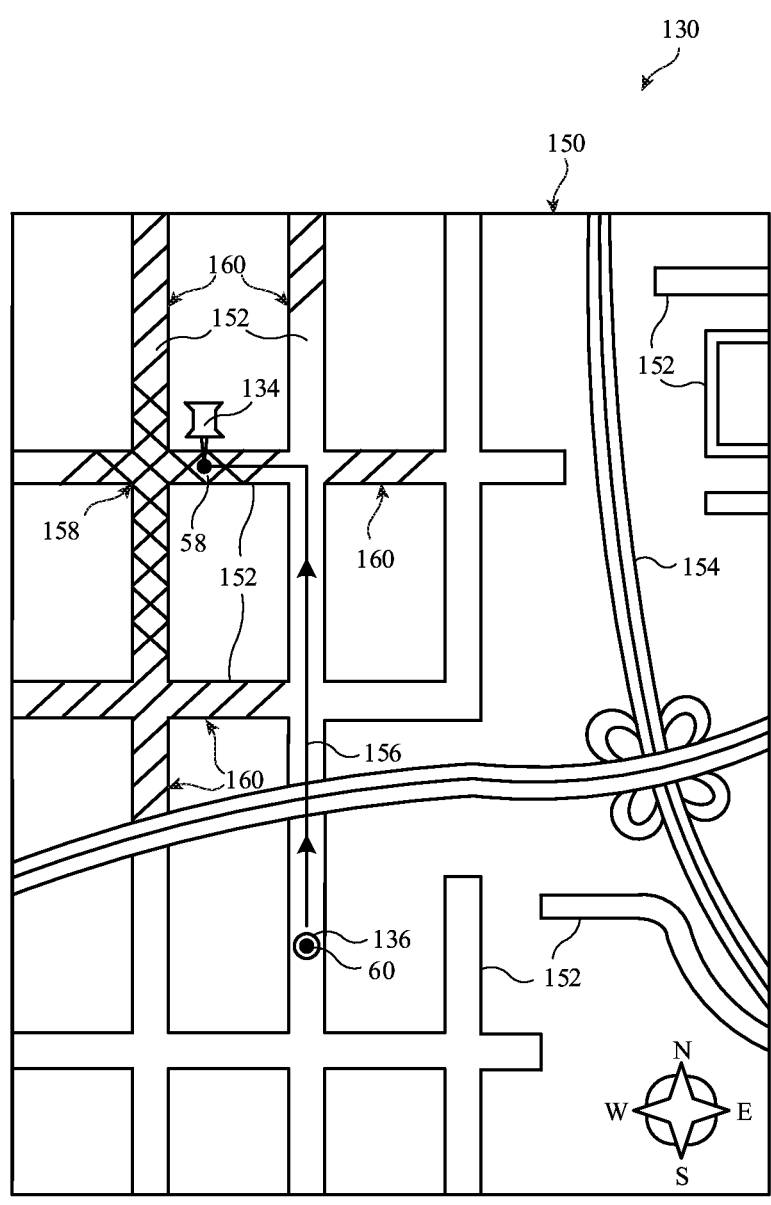
FIG. 7 is a diagram of an illustrative map that may be displayed on a graphical user interface to identify, to a user, locations at which the user equipment may perform satisfactory wireless communications with external wireless communications equipment in accordance with some embodiments.

FIG. 7 is a diagram of an exemplary map that may be displayed in graphical user interface 130 to inform the user of locations with satisfactory wireless coverage. As shown in FIG. 7, graphical user interface 130 may display geographic map 150. Graphical user interface 130 may identify the present location 60 of user equipment 12 via graphical indicator (icon) 136 on map 150.

Map 150 may display pathways such as paths 152 and 154 (e.g., paths 152 and 154 may be displayed as other visual indicators 140 of FIG. 6). Paths 152 and 154 may correspond to roadways, streets, highways, freeways, walking paths, sidewalks, trails, and/or any other desired paths that may be traversed by the user while carrying user equipment 12. For example, paths 152 may be city streets whereas paths 154 are freeways running through the geographical area in which user equipment 12 is located.

User equipment 12 may not have satisfactory wireless coverage at location 60. Map 150 may be used to identify one or more locations having satisfactory wireless coverage to the user. For example, graphical user interface 130 may display icon 134 at location 58 where user equipment 12 previously had satisfactory wireless coverage. Map 150 may be used to display a route from the user's current location (e.g., present location 60) to location 58. For example, map 150 may display route indicator 156 (e.g., a graphical line, arrow, combination of lines and arrows, etc.) that identifies the path from present location 60 to location 58 on map 150. Route indicator 156 may, for example, be confined to the paths 152 and/or 154 on map 150 (e.g., such that the route indicator identifies driving directions from present location 60 to location 58 on the streets and/or freeways of the geographic area).

If desired, map 150 may display graphical indicators of the different levels of wireless coverage provided at different portions of map 150 (e.g., using other visual indicators 140 of FIG. 6). For example, map 150 may display a heatmap or other graphical indicator identifying regions of map 150 with different levels of wireless coverage. The different levels of wireless coverage identified by the heatmap may be determined by user equipment 12 as user equipment 12 traverses the geographic area (e.g., while processing step 82 of FIG. 4) and/or may be gathered by other user equipment as the other user equipment traverses the geographic area (e.g., the heatmap may be a crowd-sourced heat map that identifies the wireless coverage provided by external communications equipment 46). The heatmap may, for example, be confined to the paths 152 and/or 154 of map 150 (e.g., the heatmap may be overlaid with paths 152 and/or 154 on graphical user interface 130 without being present on other portions of the map such as the areas between paths 152 and/or 154).

As shown in the example of FIG. 7, for portions of map 150 without satisfactory wireless coverage, graphical user interface 130 may display paths 152 and 154 without any shading. For regions of map 150 with a first level of wireless coverage, graphical user interface 130 may overlay cross-hatch pattern 160 onto the paths 152 and/or 154 within those regions. For regions of map 150 with a second level of wireless coverage greater than the first level of wireless coverage (e.g., regions with satisfactory wireless coverage), graphical user interface 130 may overlay double cross-hatch pattern 158 onto the paths 152 and/or 154 within those regions. This may identify locations on the map where the user can travel to obtain improved wireless coverage (e.g., locations such as location 58). The user may use map 150 and the overlaid heatmap to navigate themselves to particular paths 152 and/or 154 with satisfactory wireless coverage (e.g., to a region on paths 152 and/or 154 with cross-hatch pattern 160 or double cross-hatch pattern 158) and/or graphical user interface 130 may display route indicator 156 to show a route on paths 152 and/or 154 from present location 60 to a location on paths 152 and/or 154 within cross-hatch pattern 160 or double cross-hatch pattern 158 (e.g., to the closest point on paths 152 and/or 154 within cross-hatch pattern 160 or double cross-hatch pattern 158, etc.).

In the example of FIG. 7, the heatmap of wireless coverage includes only three levels of granularity (e.g., regions without cross-hatching, regions with cross-hatch pattern 160, and regions with double cross-hatch pattern 158). This is merely illustrative. The heatmap may graphically identify any desired number of discrete and/or continuous levels of wireless coverage provided by external communications equipment 46. For example, the heatmap may user a color spectrum to identify portions of paths 152 and/or 154 with any desired number of different levels of wireless coverage (e.g., green regions may correspond to locations with relatively high wireless coverage whereas red regions may correspond to locations with relatively low wireless coverage and colors on the color spectrum between green and red may be used to identify intermediate levels of wireless coverage). Graphical user interface 130 may display both icon 134 and the heatmap, may display only icon 134 without displaying a heatmap, or may display only the heatmap without displaying icon 134. The heatmap may, for example, be displayed as a graphical layer that overlays paths 152 and/or 154 (e.g., whereas the other portions of map 150 are masked out of or omitted from the displayed heatmap). The user may provide a user input to toggle the heat map on or off, to select the type of graphical indicators displayed on map 150, etc. The example of FIG. 7 is merely illustrative.

The above-described examples may apply to communications between user equipment 12 and external communications equipment 46 in any desired communications bands. Consider a more particular example in which user equipment 12 and external communications equipment 46 perform cellular telephone communications (e.g., an example in which radio-frequency signals 40 of FIG. 1 are conveyed in a cellular telephone communications band such as a 4G LTE communications band). In this example, user equipment 12 may use the methods described herein in scenarios where user equipment 12 has entered an area with no cellular telephone service provided by external communications equipment 46.

For example, when user equipment 12 is at location 60 (FIGS. 2 and 6), the wireless performance metric data gathered by user equipment 12 may indicate that user equipment 12 is at a location without cellular telephone service (e.g., RSRP values gathered by user equipment 12 may be less than −130 dBm at location 60 for every continuous duration Y while the user is at location 60). The gathering of such wireless performance metric data may itself form a trigger condition that autonomously triggers user equipment 12 to identify one or more of the previous locations where there was satisfactory wireless coverage (e.g., such that processing may proceed along path 94 of FIG. 4). Alternatively, user equipment 12 may wait for a user to provide a user input to serve as the trigger condition. The locations where there was satisfactory wireless coverage may, for example, be locations where the gathered RSRP values exceeded a threshold TH of −90 dBm for a continuous duration Y (e.g., locations 56 or 58 of FIG. 2). The user equipment may then identify these locations to the user (e.g., using graphical user interface 130 of FIG. 6, while processing step 96 of FIG. 4, etc.). As an example, the user equipment may guide the user with the route, distance, and/or time from their current location (e.g., location 60) to the identified location(s) (e.g., locations 56 and/or 58) in a maps or navigation application running on user equipment 12. This example as described in connection with cellular telephone (e.g., 4G LTE) communications is merely illustrative and, in general, similar operations may be performed even when other communications bands and/or radio access technologies are used to convey radio-frequency signals 40 between user equipment 12 and external communications equipment 46 (e.g., location 60 may be a location without wireless coverage in any desired communications band whereas locations 56 and 58 are locations with wireless coverage in that communications band).

As another example, user equipment 12 and external communications equipment 46 may perform cellular telephone communications in a 5G communications band such as a 5G Frequency Range 2 (FR2) communications band (e.g., a band that includes frequencies between 24.25 and 52.6 GHz). In this example, user equipment 12 may be running a software application that requires a relatively high download speeds or a relatively low latency (e.g., a multiplayer or streaming gaming application that requires low latency Internet connectivity, a high definition video streaming application that requires high download speeds to minimize buffering times, etc.).

User equipment 12 may be at a location where external communications equipment 46 does not have any 5G FR2 coverage from external communications equipment 46 (e.g., at location 60 of FIGS. 2 and 6). Because 5G FR2 communications are often confined to line-of-sight, such a scenario may arise, for example, when a building or other obstacle(s) are located between external communications equipment 46 and user equipment 12 (e.g., location 60 may be located around the corner from a city street that has 5G FR2 coverage provided by external communications equipment 46). While user equipment 12 may have other wireless coverage at this location (e.g., 3G coverage, 4G LTE coverage, etc.), the existing wireless coverage at this location may be insufficient to support the high download speed or low latency required by the application running on user equipment 12. The application may issue a trigger signal indicative of the need for relatively high download speeds and/or the user may provide a suitable user input, which may serve as the trigger condition that triggers user equipment 12 to identify locations 56 and/or 58 (FIGS. 2 and 6). Locations 56 and 58 may, for example, be locations where external communications equipment 46 offers 5G FR2 coverage (e.g., with satisfactory link quality). If, for example, location 60 (FIG. 6) is a location along a street without 5G FR2 coverage (e.g., because buildings lie between location 60 and external communications equipment 46), locations 56 and 58 may be locations along a street that does have 5G FR2 coverage (e.g., a street with line-of-sight to external communications equipment 46).

The user equipment may then identify these locations to the user (e.g., using graphical user interface 130 of FIG. 6, while processing step 96 of FIG. 4, etc.). As an example, the user equipment may guide the user with the route, distance, and/or time from their current location (e.g., location 60) to the identified location(s) (e.g., locations 56 and/or 58) in a maps or navigation application running on user equipment 12. This example as described in connection with 5G FR2 coverage is merely illustrative and, in general, similar operations may be performed to identify locations with wireless coverage in any desired communications bands supported by any desired radio access technologies.

Consider another example in which user equipment 12 and external communications equipment 46 perform wireless local area network communications in a communications band such as a 2.4 GHz WLAN band and/or a 5 GHz WLAN band. In this example, the user and user equipment 12 may be traveling outside of the user's home country, where the user equipment does not also have access to a cellular telephone roaming network. In order to connect to the larger communications network (e.g., the Internet), the user may search for non-captive Wi-Fi networks such as Wi-Fi networks that are offered in coffee shops, shopping malls, airports, or other public places.

However, rather than requiring the user to actively search for a non-captive Wi-Fi network, user equipment 12 may record the locations with available non-captive Wi-Fi networks as the user equipment traverses geographic region 50 (e.g., user equipment 12 may record locations with non-captive Wi-Fi networks while processing the steps of FIG. 4). For example, locations 56 and 58 of FIGS. 2 and 6 may be locations with available non-captive Wi-Fi networks. Then, at a later time when the user desires access to the larger communications network but is at a location where no non-captive Wi-Fi network is available (e.g., at location 60 of FIGS. 2 and 6), the user may provide a user input that serves as the trigger condition that triggers user equipment 12 to identify locations 56 and/or 58 where non-captive Wi-Fi networks were previously found. In another suitable arrangement, an application running on user equipment 12 may issue an application call that serves as the trigger condition, or the application may issue a prompt to the user asking the user if they would like to display previously-discovered locations with a non-captive Wi-Fi network.

The user equipment may then identify these locations to the user (e.g., using graphical user interface 130 of FIG. 6, while processing step 96 of FIG. 4, etc.). As an example, the user equipment may guide the user with the route, distance, and/or time from their current location (e.g., location 60) to the identified location(s) (e.g., locations 56 and/or 58) in a maps or navigation application running on user equipment 12. This may allow the user to quickly return to locations where a non-captive Wi-Fi network was previously available for user equipment 12. This example as described in connection with the availability of non-captive Wi-Fi networks is merely illustrative and, in general, similar operations may be performed to identify locations with network availability in any desired communications bands supported by any desired radio access technologies.

In another suitable arrangement, similar operations may be performed to record and identify the locations of captive Wi-Fi networks to the user. Captive Wi-Fi networks are available in public places and are provided to paid subscribers of a particular network service provider when the subscribers are away from their home network. In this scenario, the user may provide a user input identifying a specific Wi-Fi network to be tracked and recorded as the user traverses geographic area 50 (e.g., the user may direct user equipment 12 to only record the location of captive Wi-Fi networks provided by a network service provider to which the user is subscribed). For example, locations 56 and 58 may be the locations of captive Wi-Fi networks provided by a network service provider to which the user is subscribed. This example as described in connection with the availability of captive Wi-Fi networks is merely illustrative and, in general, similar operations may be performed to identify locations with network availability in any desired communications bands to subscribers of a particular network service provider.

In yet another suitable arrangement, user equipment 12 and external communications equipment 46 may perform cellular telephone communications that are subject to a high amount of interference at certain locations. Such interference may produce a drop in gathered RSRQ values and a rise in gathered BLER values, for example. In this example, location 60 may be a location with an excessive amount of such interference whereas locations 56 and 58 are locations that are free from the interference. The user equipment may then identify these locations to the user (e.g., using graphical user interface 130 of FIG. 6, while processing step 96 of FIG. 4, etc.). As an example, the user equipment may guide the user with the route, distance, and/or time from their current location (e.g., location 60) to the identified location(s) (e.g., locations 56 and/or 58) in a maps or navigation application running on user equipment 12. This may allow the user to quickly return to locations without excessive signal interference and that were previously available for user equipment 12. This example as described in connection cellular telephone communications is merely illustrative and, in general, similar operations may be performed to identify locations that offer sufficiently low signal interference (e.g., interference below a threshold value) in any desired communications bands supported by any desired radio access technologies.

The methods and operations described above in connection with FIGS. 1-6 may be performed by the components of user equipment 12 using software, firmware, and/or hardware (e.g., dedicated circuitry or hardware). Software code for performing these operations may be stored on non-transitory computer readable storage media (e.g., tangible computer readable storage media) stored on one or more of the components of communications system 10 or elsewhere (e.g., storage circuitry 20 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of communications system 10 (e.g., processing circuitry 18 of FIG. 1). The processing circuitry may include microprocessors, central processing units (CPUs), application-specific integrated circuits with processing circuitry, or other processing circuitry.

As described above, one aspect of the present technology is the gathering and use of data available from various sources to improve the wireless performance of user equipment as the user equipment moves through a geographic area. The present disclosure contemplates that in some instances, this gathered data may include personal information data that uniquely identifies or can be used to contact or locate a specific person (e.g., a user of user equipment 12). Such personal information data can include demographic data, location-based data, sensor-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to direct a user to a location with satisfactory wireless coverage, to provide location-based data to other user equipment for direction to locations with satisfactory wireless coverage, to display content on a display, and/or to perform other desired wireless communications operations. Accordingly, use of such personal information data enables users to perform satisfactory wireless communications as corresponding user equipment traverses a geographic area. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of location-based data, sensor data, and the use thereof in performing wireless communications operations, the present technology can be configured to allow users to select to "opt in" or "opt out" of participation in the collection of personal information data during registration for services or anytime thereafter. In another example, users can select not to perform these operations that gather personal information data. In yet another example, users can select to limit the length of time these operations are performed. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, user equipment 12 may perform satisfactory wireless communications operations as the user equipment traverses a geographic area based on non-personal information data or a bare minimum amount of personal information, such as the content being requested by the device associated with a user, other non-personal information available to the display system, or publicly available information.

The foregoing is merely illustrative and various modifications can be made to the described embodiments. The foregoing embodiments may be implemented individually or in any combination.

What is claimed is:

1. An electronic device configured to perform wireless communications with external communications equipment, the electronic device comprising:
    a display;
    an antenna configured to receive downlink signals from the external communications equipment;
    an accelerometer configured to generate accelerometer data;
    measurement circuitry configured to generate wireless performance metric data from the downlink signals received by the antenna;
    one or more processors configured to:
        store a geographic location identifier when the wireless performance metric data exceeds, for a predetermined time period, a threshold value,
        adjust the predetermined time period based on the generated accelerometer data, and
        present, using the display, a visual indicator associated with the stored geographic location identifier; and
    an ambient light sensor configured to generate ambient light sensor data, the one or more processors being further configured to adjust the predetermined time period based on the ambient light sensor data.

2. The electronic device of claim 1, wherein the stored geographic location identifier represents a geographic location of the electronic device where the measurement circuitry generated the wireless performance metric data that exceeds, for the predetermined time period, the threshold value.

3. The electronic device of claim 2, wherein the predetermined time period is at least 4 seconds.

4. The electronic device of claim 1, wherein the wireless performance metric data comprises one or more Received Signal Strength Indicator (RSSI) values.

5. The electronic device of claim 1, the one or more processors being further configured to control the display to present the visual indicator in response to receiving an input at a user interface of the electronic device.

6. The electronic device of claim 5, wherein the input comprises a touch screen input received by the display.

7. The electronic device of claim 1, wherein the visual indicator comprises a map that includes a display element associated with the stored geographic location identifier.

8. The electronic device of claim 1, wherein the visual indicator comprises a text-based message identifying one or more directions from a current location of the electronic device to a location associated with the stored geographic location identifier.

9. The electronic device of claim 1, the one or more processors being further configured to delete the stored geographic location identifier after a predetermined moving time window.

10. The electronic device of claim 1, the one or more processors being further configured to adjust the predetermined time period based on a speed of the electronic device identified by the accelerometer data.

11. An electronic device configured to perform wireless communications with external communications equipment, the electronic device comprising:

a display;

an antenna configured to receive downlink signals from the external communications equipment;

an ambient light sensor configured to generate ambient light sensor data;

measurement circuitry configured to generate wireless performance metric data from the downlink signals received by the antenna; and one or more processors configured to:

store a geographic location identifier when the wireless performance metric data exceeds, for a predetermined time period, a threshold value, adjust the predetermined time period based on the generated ambient light sensor data, and present, using the display, a visual indicator associated with the stored geographic location identifier.

12. The electronic device of claim 11, wherein the stored geographic location identifier represents a geographic location of the electronic device where the measurement circuitry generated the wireless performance metric data that exceeds, for the predetermined time period, the threshold value.

13. The electronic device of claim 12, wherein the predetermined time period is at least 4 seconds.

14. The electronic device of claim 11, wherein the wireless performance metric data comprises one or more Received Signal Strength Indicator (RSSI) values.

* * * * *